United States Patent [19]

Mazza

[11] 3,823,259

[45] July 9, 1974

[54] METHOD AND APPARATUS FOR TRANSFERRING COMMANDS IN CLOSED LOOP TELEVISION INSTALLATIONS

[75] Inventor: Lamberto Mazza, Pordenone, Italy

[73] Assignee: Industrie A. Zanussi S.p.A., Pordenone, Italy

[22] Filed: Mar. 6, 1972

[21] Appl. No.: 232,114

[52] U.S. Cl. .......... 178/5.6

[51] Int. Cl. .......... H04n 7/18

[58] Field of Search .......... 178/5.6, 5.8, DIG. 13, 178/DIG. 23, DIG. 39, DIG. 22, 179/15 AZ

[56] References Cited

UNITED STATES PATENTS

| | | | |
|---|---|---|---|
| 2,543,015 | 2/1951 | Grieg | 178/5.8 |
| 2,935,557 | 5/1960 | Bushman | 178/5.8 |
| 3,084,213 | 4/1963 | Lemelson | 178/DIG. 22 |
| 3,493,674 | 2/1970 | Houghton | 178/DIG. 23 |
| 3,580,998 | 5/1971 | Hammond | 178/DIG. 23 |
| 3,726,992 | 4/1973 | Eguchi et al. | 178/5.6 |

*Primary Examiner*—Harvey E. Springborn
*Attorney, Agent, or Firm*—Holman & Stern

[57] ABSTRACT

A TV-assisted intercommunication system for apartment buildings is disclosed, in which each receiving site is preliminarily associated with a predetermined pulse of a set of line synchronizing pulses as contained in a transmitted video signal. At every command as impressed from a takeup site, an encoded pulse associated with the preselected receiving site is sent, whereafter, in the preselected receiving site, the encoded pulse is recognized by comparing it with the pulses of the transmitted video signal, the result being that a call signal is produced just at the preselected receiving site (e.g., an apartment of the building) and not elsewhere. The method and the circuitry of the invention can be applied to any closed-loop television system.

9 Claims, 3 Drawing Figures

METHOD AND APPARATUS FOR TRANSFERRING COMMANDS IN CLOSED LOOP TELEVISION INSTALLATIONS

BACKGROUND OF THE INVENTION

In the U.S. Pat. application No. 126160 of Mar. 19, 1971 in the name of the same applicant hereof, a method is described, along with the attendant device for transferring commands (such as horizontal and vertical shift commands for the TV camera and those related to the three variable components of the objective lens, such as focal length, diaphragm aperture and dollying in) from the control emplacement to the takeup emplacement of a closed loop TV installation. By such a method it is possible to suppress completely the lines added to the coaxial cable for the video signal, which are required in a number which is equal to that of the transferred commands, and to utilize the coaxial cable alone for transferring said commands from the control emplacement to the takeup site. At the same time, the synchronization between the TV camera takeup stage and the commands transferred thereto from the control site is rendered simple and automatic, by selecting a predetermined number of line synchronizing pulses from the video signal transferred from the takeup site to the control site and, in correspondence with the latter, by counting said selected pulses and converting the counted number into a signal having a value and an intended use which are a function of said counted number.

SUMMARY OF THE INVENTION

An object of the present invention is to solve the problem of sending signals from the takeup site to the selected control sites, in a simple and economically acceptable manner, in a closed loop TV installation. For example, the present invention permits that a call signal be transferred within a TV assisted intercommunication system, by utilizing the same coaxial cable as used for transferring the video signal.

In this connection, there is an Italian Pat. application No. 26896 A/70 filed on July 2, 1970 which is now Pat. No. 900,118 in the name of the same applicants, in which there is described and claimed a TV-assisted intercommunication system wherein the lines connecting a building entrance hall with the several apartments in the building are reduced to a single line only, even by maintaining different from one another the several signals (video-, audio-, call- and door-opening signals) conveyed thereon.

As regards the call signal, a central unit placed in correspondence of the takeup site comprises a plurality of pushbuttons, which are active upon an oscillator so as to cause it to oscillate at different frequencies which are a function of the particular pushbuttons which is actuated every time.

It is apparent that such a difference between the several frequencies, as necessary for obtaining the selection of an apartment, is a limitation or, at least, a constructional complication (the result being a first-cost increase) in regards to the oscillating circuits of said oscillator. In the case in which the building where the TV-assisted intercommunication system comprises a high number of apartments, it would be desirable to obtain a system with a less critical operative mode and affording the possibility of sending on the same cable a greater number of commands.

Thus, another object of the present invention is to provide an improved system for transmitting the call signal in a TV-assisted intercommunication system having a construction which is simple and cheap and having an operability that is fully reliable.

The objects of the invention are achieved by means of a method which is characterized in that each reception site is initially associated with a predetermined pulse of a line synchronized pulse series as contained in a transferred video signal. In connection with each command impressed from the takeup site, an encoded pulse is sent which is associated to the preselected receiving site, the encoded pulse is recognized in the preselected receiving site and compared with the pulses of the transferred video signal so that a call signal is produced in said receiving site.

The device which enables such a method to be put into practice is characterized, in turn, in that it comprises a circuit for associating each receiving site with a preselected line synchronizing pulse as contained in the video signal which is transferred, means for encoding said pulse associated with the preselected receiving site, a circuit for carrying out in the preselected receiving site the recognition of said encoded pulse, and a circuit for producing a call signal as a result of the recognition of said encoded pulse. Preferably, the encoding of the pulses is carried out by lowering their level with the aid of an appropriate mixer-summer.

BRIEF DESCRIPTION OF THE DRAWINGS

The features and advantages of the present invention will be better understood from the ensuing detailed description of a preferred embodiment of the device according to the invention. In the detailed description, which is concerned only with the calling system of a TV-assisted intercommunication system and is given by way of example only and without limitation, reference will be had to the accompanying drawings, wherein.

DETAILED DESCRIPTION OF THE PREFERRED EMBODIMENTS

Figure 1:
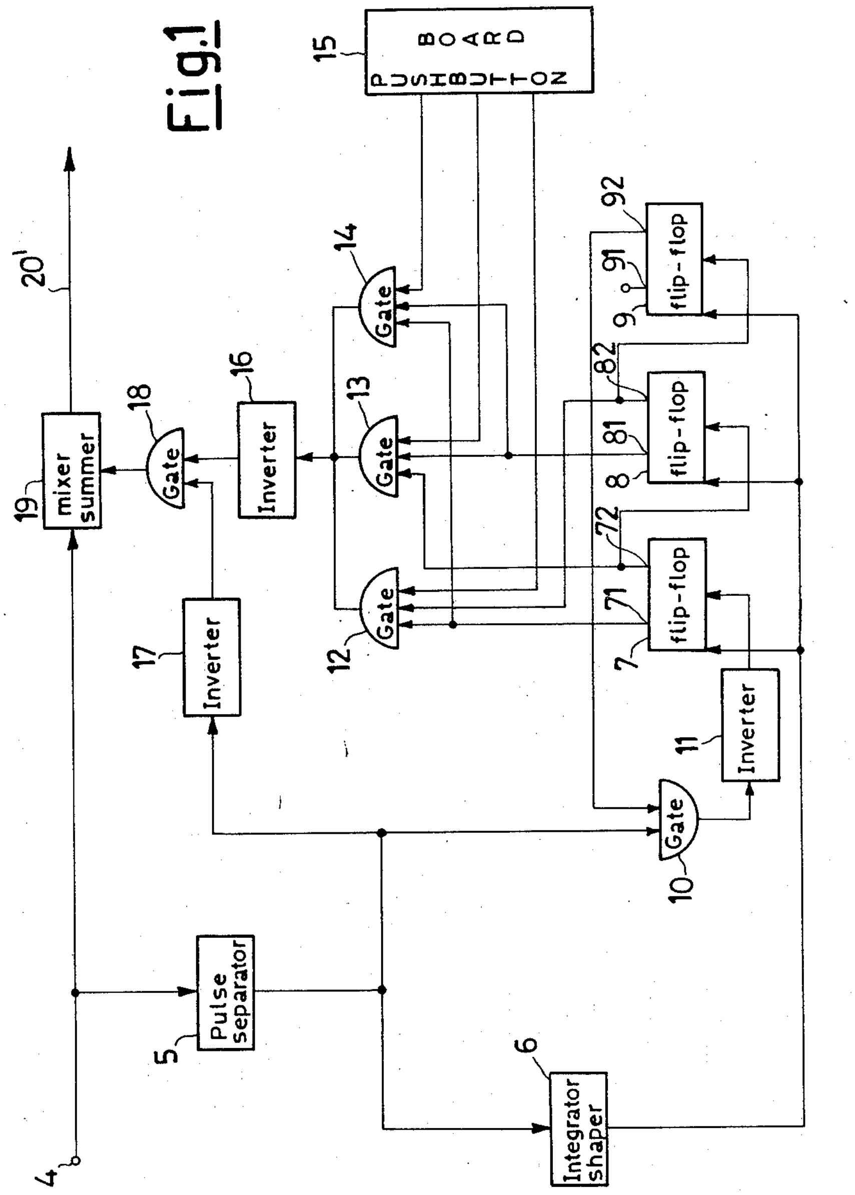
FIG. 1 shows the block diagram of the sending unit of the device according to the invention.

The transmission unit show in FIG. 1 is a single one for the entire system and is placed at the entry hall of the building wherein the system in question has been installed, in correspondence with the TV-camera (not shown). The TV-camera output is connected to a terminal 4 and then to a pulse separator 5 whose output signal is sent to an integrator and shaper 6, to one input of a gate element 10, and to an inverter 17; respectively. The output of the integrator and shaper 6 is connected to a plurality of flip-flop circuits (in the example shown they are in a number three and indicated at 7, 8 and 9, respectively) which are connected to each other so as to make up a binary counter. The output of the gate element 10 is connected to an inverter 11, through which it drives the multivibrator 7; a second input to the gate 10 is connected to one output 92 of the flip-flop 9, whose other output 91 is connected in a temporary manner, that is, it is not used. The first output 71 and the second output 72 of the flip-flop 7 drives a (common) input to two gate elements 12 and 14, respectively, and an input to a gate element 13. Likewise, the first output 81 and the second output 82 of the multivibrator 8 drive a second (common) input to the gates 13 and 14, respectively, and a second input to the gate 12. Each of the gates 12, 13, 14 which have a common output, is also equipped with a third input, each connected to a respective call pushbutton (not shown) which is a part of a pushbutton board 15. The common output of the gates 12, 13, 14 is connected, via an inverter 16, to an input to an additional gate element 18, a second input of which is connected to the output of the inverter 17. The output of the gate 18, as well as the output of the TV-camera via the terminal 4, is connected to a mixer-summer 19 which sends the mixed signals, through a lead 20', to the receiving units.

The number of flip-flops which make up the binary counter is a function of the number of call pushbuttons and, consequently, of the number of gates driven thereby. Finally, (as will become more clearly apparent hereinafter) the number of flip-flops is a function of the number of receiving units connected to the cable 20'.

By translating into mathematical expressions the definition given above, by indicating with $x$ the number of flip-flops which are necessary for a correct operation of the device, and by indicating with $n$ the number of the pushbuttons used, said number of flip-flops can be obtained from the following formula:

$$x \geqq lg\ n/lg\ 2 + 1$$

This formula can be explained by considering the fact that each bistable multivibrator which is an integral part of the binary counter has two possible states, generally indicated by "0" (which represents a zero voltage) and "1" (which represents a positive voltage). The counting capacity of the counter varies according to an exponential of base 2, said exponential being established by the number of multivibrators; in addition the counting capacity of the counter must be at least equal to the number of call pushbuttons and an additional multivibrator is required (9, in example of FIG. 1) for the purposes which will be clearly explained hereinafter.

Figure 2:
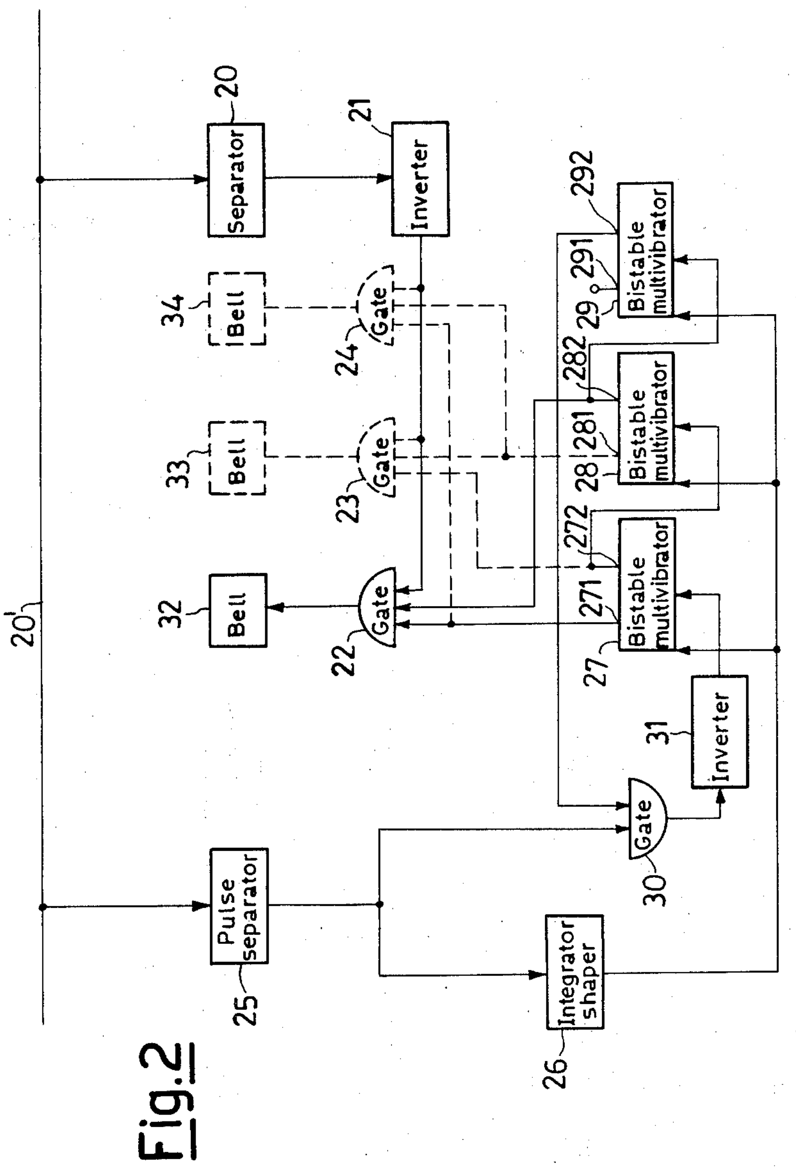
FIG. 2 shows, in solid lines, the block diagram of one of the receiving units of the device according to the invention and, in dotted lines, the modifications introduced in the circuitry in the case where the receiving units of the device according to the invention are plural.

The receiving unit as shown in solid lines in FIG. 2 is associated, for example, to the first of the apartments in the building where the device according to the invention is installed. The signals coming from the cable 20' are sent to a pulse separator 25, whose output is connected to one input of the gate element 30 and to an integrator shaper 26, whose output is connected to a plurality of bistable multivibrators (in the example of the drawing they are represented in the number of three, as indicated at 27, 28, 29, respectively), which make up a binary counter wholly similar to the one which is an integral part of the device of FIG. 1. A second input to the gate 30 is connected to an output 292 of the multivibrator 29, whose other output 291 is connected in a temporary manner; the output of the gate 30 drives, through an inverter 31, the multivibrator 27, one of whose outputs 271 is connected to one input of a gate element 22. Said gate has two additional inputs, which are respectively connected to an output 282 of the multivibrator 28 and, through an inverter 21 and a separator 20, to the cable 20'. The output of the gate 22 drives the actuation of a signalling device, for example a bell 32.

The receiving unit, associated for example to the second apartment, is wholly similar to the one described above, the only change being that the gate 22 is replaced by an identical gate 23, whose inputs (as shown in the drawing in dotted lines) are respectively connected to the complementary outputs 272 and 281 of the multivibrators 27 and 28, and to the output of the inverter 21. Likewise, in the receiving unit which is associated to the third apartment, the signalling device is actuated by the signal at the output of a gate 24, whose inputs are connected, as shown in dotted lines in the drawing, to one of the outputs 271 and 281 of each multivibrator 27 and 28, and to the output of the inverter 21, respectively. The gates 23 and 24 can control bells such as 33 and 34.

Figure 3:
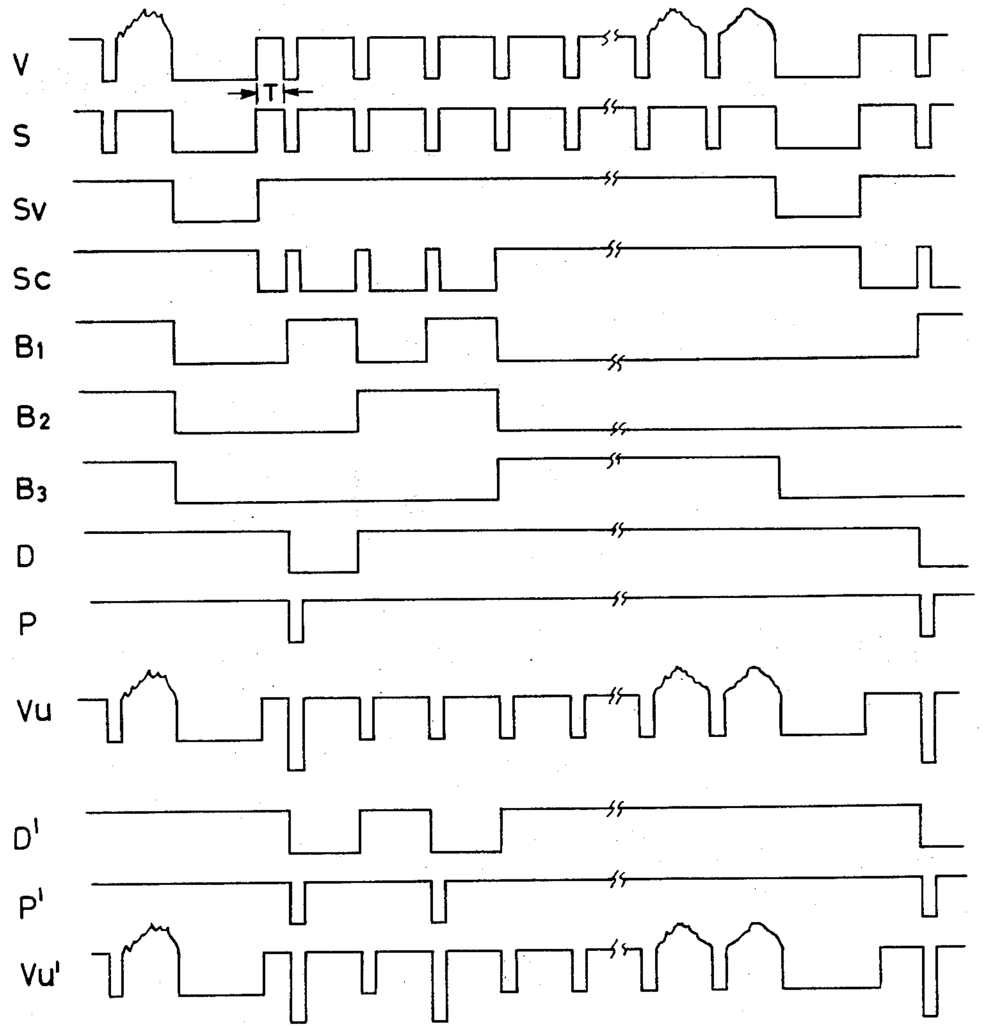
FIG. 3 shows, in the form of superposed plots, the variations of the logical levels of the component parts contained in the devices of FIGS. 1 and 2.

To explain the general operation of the device as shown in FIGS. 1 and 2, let it be assumed that the flip-flops are at rest, or zero conditions of the counters as formed by the multivibrators or flip-flops 7, 8, 9 and 27, 28, 29, respectively, be those corresponding to logical levels "0" for the outputs at the left (FIGS. 1 and 2) of all the multivibrators enumerated above; in addition, let it be assumed that each of the gates of the device shown in the FIGS. 1 and 2 is of the kind having the output at the logical level "0" in the only case where all the inputs to each gate are at the logical level "1," whereas, for any other combination of inputs the logical level at the output is "1." Lastly, let it be assumed that the actuation of a pushbutton corresponds to sending to the respective gate a signal having the logical level "1." It should be noted that, whenever a certain signal is indicated herein with the same symbol as used in FIG. 3 but with a dash superimposed thereto, the signal in question is to be construed to be equal and opposite to the corresponding signal as shown in FIG. 3 of the drawings; the signal $\overline{S}$ will thus be equal and opposite to the signal S and so forth.

With reference to FIGS. 1 and 2, the contents of the video signal V at the terminal 4 is converted by the specially provided separator 5 into a signal S, as formed by the horizontal and the vertical synchronizing pulses. In the signal V it is required that the first horizontal synchronizing pulse travels with a delay T (see FIG. 3) of at least 30 microseconds (this is a function of the operative speed of the binary counter) with respect to the termination of the vertical synchronizing pulse. The integrator shaper 6 provides to separate from the signal S, the vertical synchronizing signal SV, through which the binary counter is reset at every half-frame. The gate 10 is driven by the signal S and the second output 92 of the multivibrator 9, inasmuch as the variation of the signal occurring at that output are represented by the symbol $\overline{B3}$. Upon each resetting the logical level of the signal $\overline{B3}$ is "1," so that the gate 10 transfers the variations of the signal S until $\overline{B3}$ is switched to the logical level "0" (that is, at the fourth pulse); at the output of the gate 10, there is thus a signal SC which is converted into $\overline{SC}$ by the inverter 11; thus signal thus goes to drive the multivibrator or flip-flop 7 of the binary counter, whose count, as has been said, reaches three (that is, the number of pushbuttons), whereafter, at the fourth pulse, the gate 10 is latched. This is to prevent the counter from performing a subsequent counting cycle during the period of the same half-frame. The variations of the logical levels at the outputs 71, 81 and 91 of the first, second and third multivibrator of the binary counter are shown in FIG. 3 by the plots B1, B2 and B3, respectively. The input to each gate 12, 13, 14 is at the logical level "0" when no signal is transmitted by the pushbutton board 15. When the pushbutton which corresponds, for example, to the gate 12, is depressed, the gate 12 receives a signal at the level of "1" and, since the other two inputs of the gate 12 are at the level "1," the output of the gate 12 takes the level "0." In as much as the outputs of the gates 13 and 14 have been left at the level "1," the common output is dependent only of the gate 12, which, being driven by the signals B1 and $\overline{B2}$, gives at the output a signal D (see FIG. 3). The signal D is converted by the inverter 16 into a signal $\overline{D}$, which, together with a signal $\overline{S}$, drawn from the signal S through the inverter 17, drives the gate 18, at whose output a signal P is obtained. The signal P represents the encoding signal which is sent to the mixer 19 together with the video signal V, to give at the output an encoded signal VU which is fed through the cable 20' and sent to the receiving units. The signal VU is characterized by a lowering of the level of the synchronizing pulse corresponding to the selected receiving site, the lowering being contained in the signal P.

Likewise, in the case that the corresponding pushbuttons are depressed simultaneously, which correspond, for example, to the gates 12 and 14, at the common output of the gates 12, 13, 14 a signal D' appears, which, together with the signal $\overline{S}$, drives in the manner described above the gate 18 and forms at the output an encoding signal P'. Through the cable 20' there is thus sent an encoded signal VU' (with two characteristic pulses which have a lowered level).

With reference to FIGS. 2 and 3, in correspondence with a receiving unit relative to the pushbutton which has been depressed, from the transmitted signal VU (which operates at a level below that of the separators 5 and 25) the command signal P only is drawn, which, converted into $\overline{P}$ by the inverter 21, drives the gate 22, the operation of the remaining portion of the circuit of FIG. 2 being substantially equal to that of the corresponding circuitry portion of FIG. 1, since the respectively processed signals VU and V are virtually equal. The gate 22 is driven, not only by the signal $\overline{P}$, but also, like the corresponding gate 12 of FIG. 1, but also by the signals B1 and $\overline{B2}$; as can be seen in the plots in the instant of time when the command pulse $\overline{P}$ arrives, all three of the signals enumerated above are at a logical level "1," the only case in which the gate 22 can have an output logical level "0." The output of the gate 22 can actuate, as aforesaid, any conventional signalling device 32.

Likewise, as the pushbuttons corresponding to the gates 12 and 14 of FIG. 1 are depressed, the two gates 22 and 24 (comprised in the respective receiving units) will have a logical level of "0" at the outputs, the result being the actuation of the two different signalling devices 32, 34, this actuation corresponding to the simultaneous call of two different apartments.

It can be easily understood that, in a device according to the invention, the auxiliary commands transmitted on the cable along with the video signal are synchronized thereby; in addition, it can be understood that the maximum number of command pulses which can be rendered different from each other and used for calling as many apartments is 312, that is the number of whole horizontal synchronism pulses contained in a half-frame of the video signal. This number, however, is apparently no limitation.

Further modifications can be made to the device as shown in FIGS. 1 and 2 within the scope of the invention. For example, one or each of the receiving units can comprise a number of gate elements 22, 23, 24 in the case in which there are desired a plurality of sound signals or receiving sites in each apartment.

A further alternative embodiment of the method and device can be the suppression of the takeup site in the mixer-summer 19 and, in each receiving site, that of the separator 20. As a matter of fact, for encoding the synchronizing pulse it is sufficient separately to transmit the two signals V and P, for example on two discrete cables (which replace the single cable 20') and compare them as they reach all the receiving sites: one site only will then be enabled to produce the call signal.

What is claimed is:

1. A method for the transmission of command signals over the video signal cable of a closed loop T.V. system from a takeup site having a TV camera which generates a video signal including sequential train of line synchronizing pulses, to selected ones of a plurality of receiving sites coupled to the cable, said method comprising the steps of:

generating at the take-up site a selection signal representative of the desired selection of at least one of the plurality of receiving sites;

lowering the level of a line synchronizing pulse occurring at a pre-determined time during the generation of the sequential pulse train in response to the selection signal;

transmitting the video signal including the lowered level line synchronizing pulse over the video signal cable to the receiving sites;

monitoring the sequential train of line sychronizing pulses at each receiving site;

generating a time pulse at each respective receiving site having a different pre-set time of occurrence in synchronism with the line sychronizing pulses during the monitoring period;

detecting at a given receiving site a time coincidence between the lower level line synchronizing pulses and the timing pulse; and generating a command signal at the given receiving site.

2. A method as claimed in claim 1, wherein the step of lowering the level of the line synchronizing pulse comprises summing algebraically of the selection signal and the line synchronizing pulse at the take-up site, thereby lowering the level thereof.

3. A method as claimed in claim 2, wherein the step of lowering the level of the line synchronizing pulse includes lowering the levels of a plurality of line synchronizing pulses simultaneously for producing a plurality of command signals at each respective receiving site.

4. A method as claimed in claim 1, wherein the step of generating the command signal at the given receiving site comprises separating of the lower level line synchronizing pulse from the transmitted video signal and comparing of the lower level pulse to the timing pulse at the given receiving site which is synchronized with the line synchronizing pulses of the transmitted video signal.

5. A device for the transmission of command signals from the take-up site to the receiving sites in a closed toop TV system comprising a take-up site having a TV camera means for producing a video signal including sequential train of line synchronizing pulses, a plurality of receiving sites that can be individually selected, and a cable for transmitting the video signal from the take-up site to the receiving sites, wherein the improvements of said device comprises:

a first generating means for generating at the take-up site a selection signal representative of a least one of the plurality of receiving sites;

lowering means for the lowering of the level of a line synchronizing pulse occurring at a pre-determined time during the generation of the sequential pulse train in response to the selection signal;

transmitting means for transmitting the video signal including the lowered level line synchronizing pulse from the take-up site to the receiving sites;

monitoring means for monitoring the sequential train of line synchronizing pulses at each receiving site;

a second generating means for generating a time pulse at each respective receiving site having a different pre-set time occurrence in synchronism with the line synchronizing pulses during the monitoring period;

detecting means for detecting at a given receiving site a time coincidence between the lowered level line synchronizing pulse and the timing pulse; and a third generating means for generating a command signal at the given receiving site.

6. A device as claimed in claim 5, wherein said lowering means for lowering the level of a line synchronizing pulse comprises a mixer-summer circuit coupled to the TV camera means and the selection signal which algebraically sums the video signal including the lowered level line synchronizing pulse at the take-up site to the selection signal, a synchronizing pulse separator circuit coupled to the TV camera means, and integrator shaper circuit coupled to the output of said synchronizing pulse separator circuit, a plurality of bistable multivibrators having their inputs coupled to the output of said integrator shaper circuit, and a plurality of corresponding gate elements coupled to the output of said bistable multivibrators which are inter-connected to each other in the form of a binary counter arrangement.

7. A device as claimed in claim 6, wherein said selection signal of said first generating means is produced at the output of said corresponding gate elements by a pushbutton board having a plurality of signal generators, said pushbutton board being coupled to each of said corresponding gate elements through an additional gate input lead.

8. A device as claimed in claim 5, wherein said monitoring means for monitoring the sequential train of line synchronizing pulses at each receiving site comprises a first synchronizing pulse separator circuit coupled to the transmitted video signal, an integrator shaper circuit coupled to the output of said first synchronizing pulse separator circuit, and a plurality of bistable multivibrators having their inputs coupled to the output of said integrator shaper circuit; said second generating means for generating a timing pulse comprises the outputs of said bistable multivibrators which are interconnected to each other in the form of a binary counter arrangement; said detecting means for detecting a time coincidence between the lower level line synchronizing pulse and the timing pulse comprises a second synchronizing pulse separator circuit coupled to the transmitted video signal for transforming it into a lower level pulse and a plurality of corresponding gate elements coupled to the outputs of said bistable multivibrators for comparing the lower level pulse coupled to each of said corresponding gate elements through an additional gate input lead connected via an integrator to the output of said second synchronizing pulse separator circuit to the timing pulse.

9. A device as claimed in claim 6, wherein said third generating means for generating a command signal at the receiving site comprises the outputs of said corresponding gate elements, said gate elements including sound signalling device coupled to each output.

* * * * *

UNITED STATES PATENT OFFICE

CERTIFICATE OF CORRECTION

Patent No. 3823259 Dated July 9, 1974

Inventor(s) Lamberto Mazza

It is certified that error appears in the above-identified patent and that said Letters Patent are hereby corrected as shown below:

[32] Foreign Priority Document
Italy 21796 A/71 filed March 15, 1971

Signed and sealed this 8th day of October 1974.

(SEAL)
Attest:

McCOY M. GIBSON JR.
Attesting Officer

C. MARSHALL DANN
Commissioner of Patents